United States Patent [19]

Masaki et al.

[11] 4,241,415
[45] Dec. 23, 1980

[54] MASKING DEVICE FOR SELECTIVELY PREVENTING VISUALIZATION OF DATA FROM A DATA OUTPUT SYSTEM

[75] Inventors: Katsumi Masaki, Kodaira; Takashi Kitamura, Yokohama, both of Japan

[73] Assignee: Canon Kabushiki Kaisha, Tokyo, Japan

[21] Appl. No.: 771,467

[22] Filed: Feb. 24, 1977

[30] Foreign Application Priority Data

Feb. 26, 1976 [JP] Japan .................................. 51-20491

[51] Int. Cl.³ .............................................. G06F 7/22
[52] U.S. Cl. ...................................... 364/900; 340/789
[58] Field of Search ... 364/900 MS File, 200 MS File; 340/324 AD, 146.3 H, 146.3 Q, 789, 799, 803, 804, 709

[56] References Cited

U.S. PATENT DOCUMENTS

| | | | |
|---|---|---|---|
| 3,501,746 | 3/1970 | Vosbury | 364/900 |
| 3,579,234 | 5/1971 | Tsumura et al. | 340/324 AD X |
| 3,623,068 | 11/1971 | Horgan et al. | 340/789 |
| 3,641,506 | 2/1972 | Cupp et al. | 364/900 |
| 3,685,019 | 8/1972 | Conroy et al. | 364/900 |
| 3,757,311 | 9/1973 | Byram et al. | 364/900 |
| 3,771,155 | 11/1973 | Hayashi et al. | 340/709 X |
| 3,772,654 | 11/1973 | Evans et al. | 364/200 |
| 3,872,462 | 3/1975 | Lemelson | 340/324 AD X |
| 3,889,253 | 6/1975 | Ross | 340/324 AD X |
| 3,895,374 | 7/1975 | Williams | 340/789 X |
| 3,911,407 | 10/1975 | Greek, Jr. et al. | 364/900 |
| 3,921,148 | 11/1975 | Ophir et al. | 364/200 |
| 3,988,728 | 10/1976 | Inoue et al. | 340/324 AD |
| 3,999,167 | 12/1976 | Ito et al. | 364/900 |
| 3,999,168 | 12/1976 | Findley et al. | 364/900 |
| 4,031,516 | 6/1977 | Kashio | 364/900 |

*Primary Examiner*—Melvin B. Chapnick
*Attorney, Agent, or Firm*—Fitzpatrick, Cella, Harper & Scinto

[57] ABSTRACT

A data masking device having a first memory for storing information code signals convertible into visible information and a second memory containing specific code signals in locations corresponding to the code signals in the first memory which selectively are not to be visualized. Signals from each memory are simultaneously read out and a detector detects the read-out of a specific code. When the device is in a mask mode and a specific code signal is detected, the information code signal corresponding to the detected specific code is masked, i.e. it is either not visualized or else a special mark is visualized in its place. When the device is in an unmask mode, the information code signals are converted into visualized information irrespective of the detection of a specific code signal during read-out.

29 Claims, 22 Drawing Figures

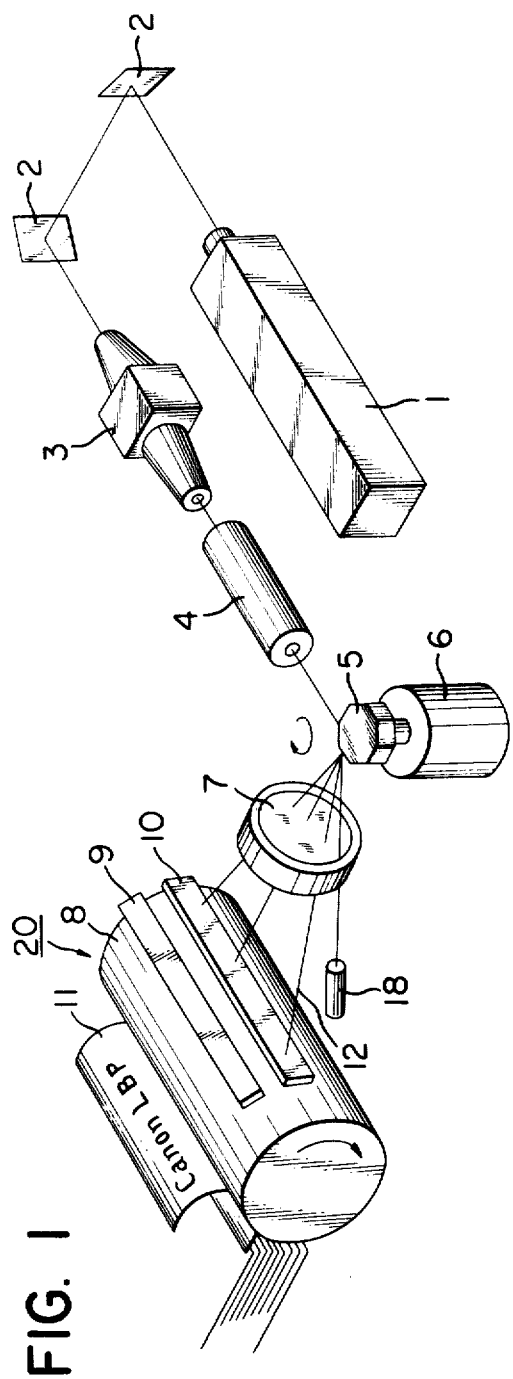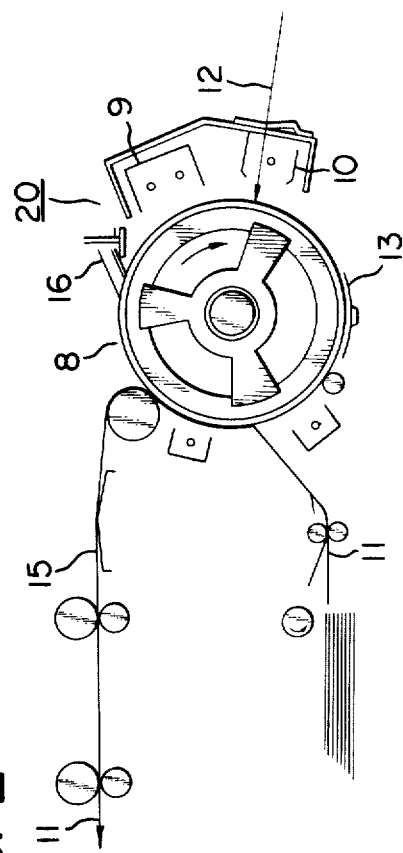
FIG. 1
FIG. 2

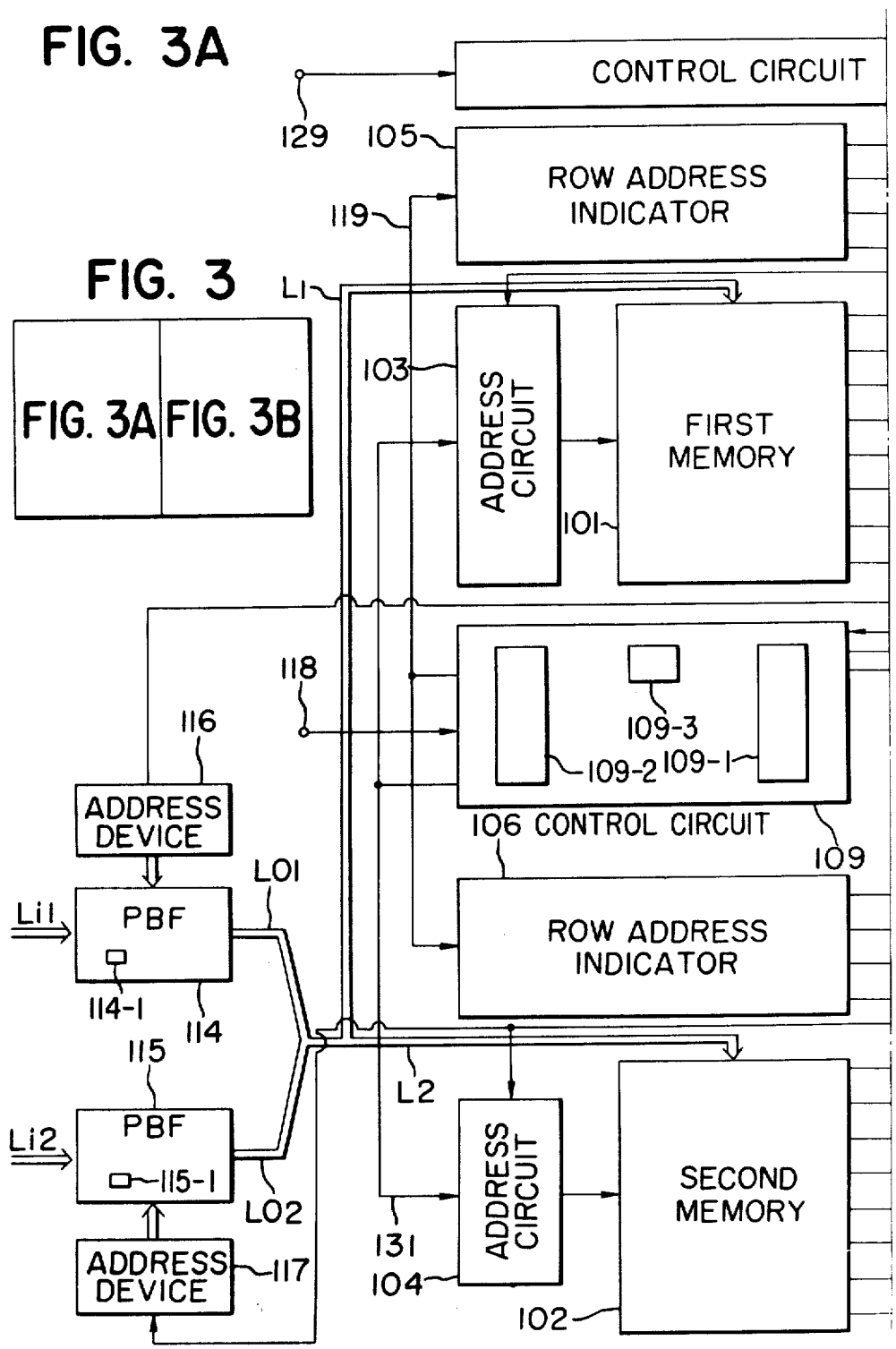

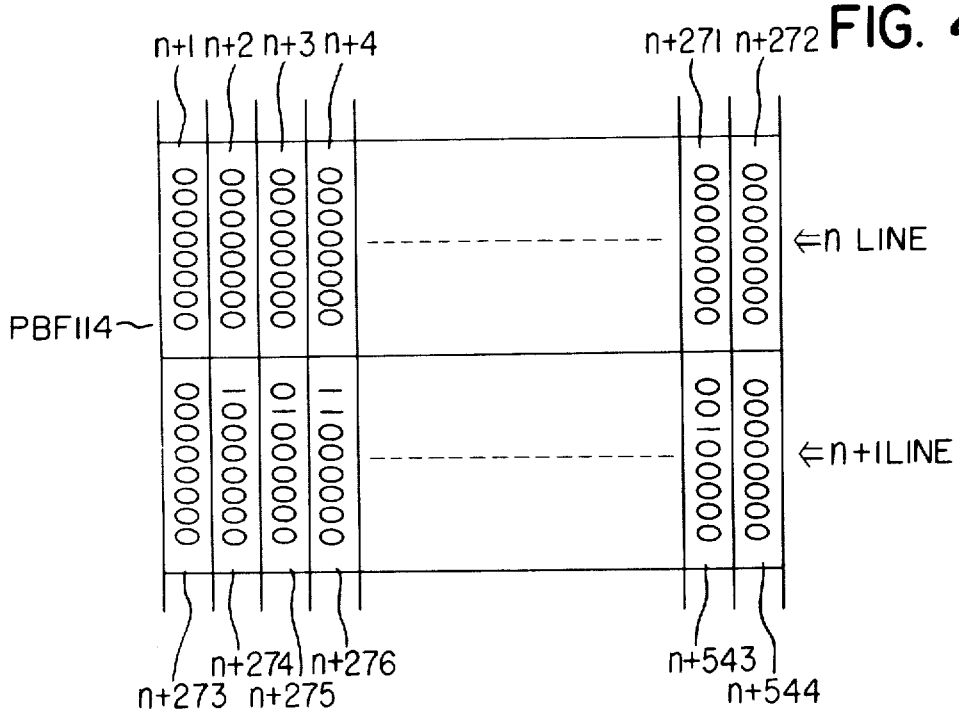
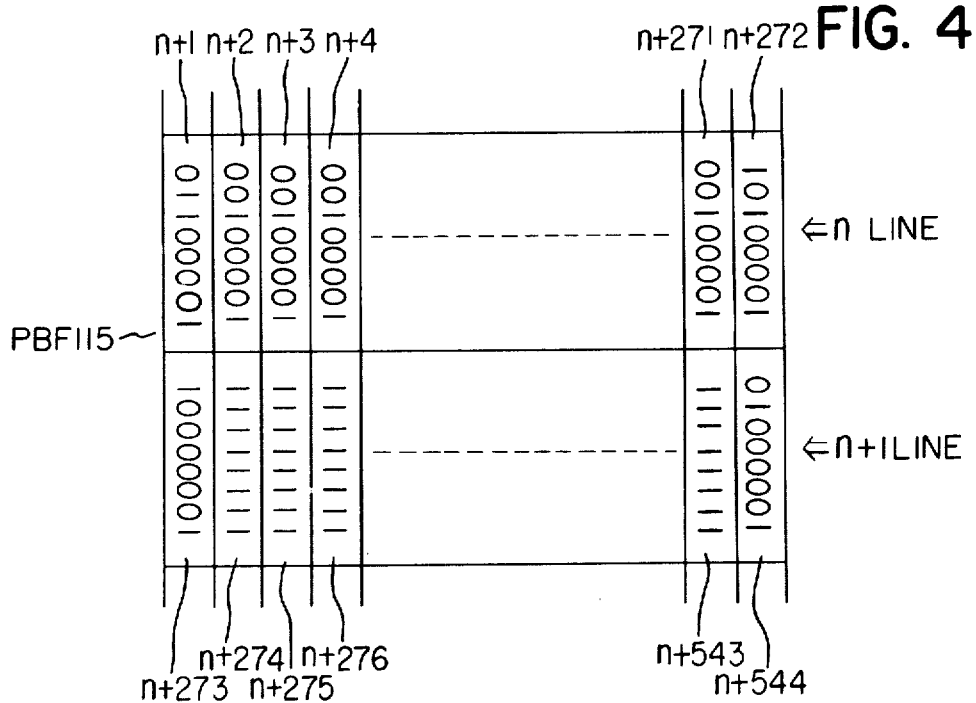

| NAME | POLLING SCORE |  |
|---|---|---|
| TANAKA | | |
| MASAKI | | |
| ITO | | |
| SATO | | |
| | | |
| | | |

FIG. 8

| NAME | POLLING SCORE | |
|---|---|---|
| TANAKA | 1934 | |
| MASAKI | 2324 | |
| ITO | 0147 | |
| SATO | 4218 | |
| | | |
| | | 189 ←S |
| | | 473 |

FIG. 9

| NAME | POLLING SCORE | |
|---|---|---|
| TANAKA | 1934 | |
| MASAKI | 2324 | |
| ITO | 0147 | |
| SATO | 4218 | |
| | | |
| | | 473 |

FIG. 13
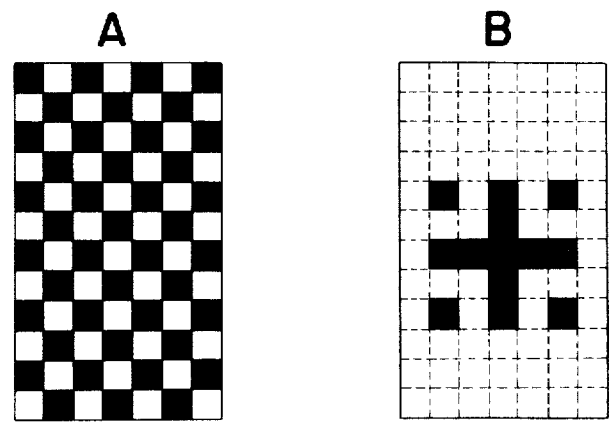
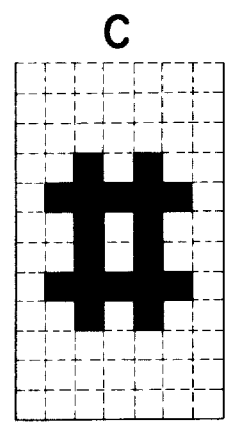
FIG. 17
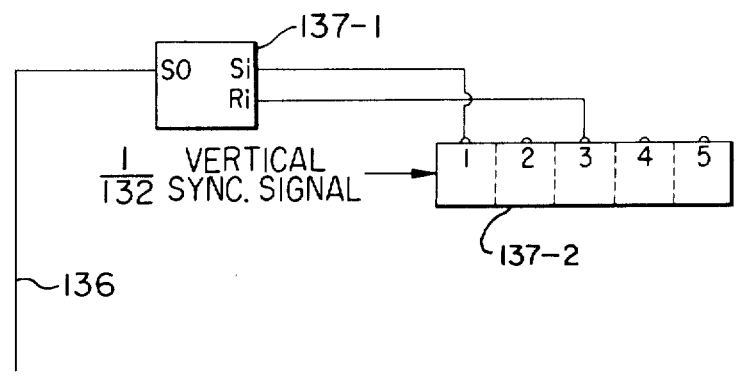

MASKING DEVICE FOR SELECTIVELY PREVENTING VISUALIZATION OF DATA FROM A DATA OUTPUT SYSTEM

BACKGROUND OF THE INVENTION

1. Field of the Invention

This invention relates to a data processor and particularly to a data processor adapted for use in a printer or a display device provided with a masking function whereby the selected data for recording or display is masked.

2. Description of the Prior Art

The conventional data processing machine is usually provided with a data output device for performing the function of recording or displaying processed data, and, in the recording or display of such data in a determined format, it is frequently desirable to conceal or mask a selected part of such data.

In the case of a printer as an example of a data output device, an impact line printer is capable of easily preparing multiple copies, and in such an instance it is already well known and widely utilized to obtain masked multiple copies wherein selected data are masked by suitably positioning the copying carbon.

On the other hand a non-impact printer is not usually capable of producing multiple copies, and it is therefore almost impossible to perform masking, particularly on the recording paper to be used on the printer.

Such a non-impact printer can be exemplified by a laser beam printer which will be further explained in the following, with particular reference to FIG. 1 schematically illustrating the fundamental construction of such a laser beam printer. The following description will be limited to the outline since the control of such a laser beam printer is explained in detail in the U.S. patent application Ser. No. 616,675 now U.S. Pat. No. 4,059,833, issued Nov. 22, 1977 and assigned to the assignee of the subject invention.

Referring to FIG. 1, a laser beam generated by an laser oscillator 1 is introduced through a mirror 2 to an input aperture of a modulator 3. Mirror 2 is utilized for deflecting the light path to minimize the necessary space and can be dispensed with if space is not an important factor.

Modulator 3 can be an acousto-optical modulating element utilizing the known acousto-optical effect or an electro-optical element utilizing the known electro-optical effect. The laser beam is subjected to intensity modulation in modulator 3 according to the input signal thereto.

When the laser oscillator is a semiconductor laser, a gas laser of the type capable of current modulation or an internal modulation laser provided with a modulating element in the light path, the modulator 3 may be dispensed with so that the laser beam is directly guided to a beam expander 4.

In the beam expander, the laser beam is expanded in diameter while maintaining the state of parallel flux. Then, the expanded laser beam is guided to a polygonal rotary mirror 5 provided with one or plural mirror faces. Rotary mirror 5 is supported by a high precision bearing (for example an air bearing) and driven by a motor 6 (for example, a hysteresis synchronous motor or a DC servo motor) at a constant speed, and the laser beam is deflected in a horizontal sweeping motion by means of the rotary mirror 5. The deflected beam is focused, by means of an imaging lens 7 having $f-\theta$ characteristic, as a spot on a photosensitive drum 8. In an ordinary imaging lens, the image position r on the focal plane is related with the incident angle $\theta$ of the beam through an equation:

$$r = f \cdot \tan \theta \tag{1}$$

where f is the focal length of the imaging lens. In the foregoing apparatus the incident angle, to the imaging lens 7, of the laser beam 12 reflected by the polygonal rotary mirror 5 changes as a first-order function of time, and the displacing speed of the spot on the photosensitive drum 8 is not constant but changes non-linearly. More specifically the displacing speed increases as the incident angle becomes larger. Consequently if a series of spots is recorded on the photosensitive drum 8 by turning on the laser beam at constant time intervals, the separation between the spots will become larger at both ends than in the center.

In order to avoid such a phenomenon, the imaging lens 7 is designed to have characteristics:

$$r = f \cdot \theta \tag{2}$$

and such a lens is called an $f-\theta$ lens.

Also in the case of focusing a parallel light beam into a spot by means of an imaging lens, the minimum diameter $d_{min}$ of the spot is given by the following equation:

$$d_{min} = \epsilon f \lambda / A \tag{3}$$

wherein:

f: focal length of imaging lens $\lambda$: wavelength of light used

A: incident aperture of imaging lens, or diameter of incident beam if smaller $\epsilon$: constant determined by the beam shape and a smaller spot diameter can be obtained by increasing A for given f and $\lambda$. The above-mentioned beam expander 4 is utilized to obtain this effect, and can be dispensed with if a desirable spot diameter $d_{min}$ can be obtained with the original beam diameter of laser oscillator.

The beam detector 18 consists of a small incident slit and a photoelectric converting element with a rapid response time (for example a PIN diode), and detects the position of the laser beam 12 in sweeping motion. The detection signal of detector 8 is utilized for determining the timing for the start of input signals into the modulator 3 for providing the photosensitive drum with the desired light information. In such a manner it is rendered possible to significantly reduce the aberration of the signal resulting from the error in the division of the reflecting faces of rotary mirror 5 and from the uneven rotation thereof thereby assuring an image of good quality and increasing the tolerance required for the rotary mirror 5 and the drive motor 6 thereby allowing a lower production cost.

As explained in the foregoing, the modulated and deflected laser beam 12 is directed to the photosensitive drum 8, and the resulting image is rendered visible by an electrographic process, then transferred to plain paper where it is fixed to obtain a hard copy.

In the following, an explanation will be given of the printing unit 20 with reference to FIG. 2.

An an example of electrographic process applicable to such a printing unit is described in the U.S. Pat. No. 3,666,363 assigned to the assignee of the present application, wherein, a photosensitive plate 8 essentially composed of an electroconductive substrate, a photoconductive layer and an insulating layer is first subjected to electrostatic charging with a corona discharger 9 to form a uniform positive or negative charge on the surface of the insulating layer thereby capturing an electrostatic charge of an inverted polarity at the interface between the photoconductive layer and the insulating layer or within the photoconductive layer. Then the charged insulating layer is subjected to irradiation of laser beam 12 simultaneously with an alternating corona discharge by an alternating corona discharger 10 thereby forming a potential difference pattern on the surface of the insulating layer according to the intensity pattern of the laser beam 12. The insulating layer is then subjected to a flush exposure to form an electrostatic image of elevated contrast on the surface of the insulating layer, which image is rendered visible in a developing device 13 by means of a developer essentially consisting of charged colored particles. The thus obtained visible image is transferred to a transfer material 11 such as paper by means of an internal or external electrical field and fixed by a fixing means 15 utilizing an infrared lamp or a hot plate to complete an electrographic print. Meanwhile the surface of the insulating layer is cleaned by a cleaning device 16 to permit repeated use of the photosensitive plate 8.

In a printer of the above-mentioned composition, the data corresponding to one page are stored in a memory device called a page buffer, and multiple copies of identical content can be obtained by repeatedly printing the data stored in the page buffer. For rapid printing, there is in fact no technical difficulty in producing multiple copies. However a difficulty is encountered in the case of obtaining masked multiple copies, wherein selected data are masked, unlike the impact printer.

The above-mentioned laser beam printer is strongly characterized as a page printer, and, in the case of producing multiple copies, it is therefore necessary to collect the data independently for each copy if there is even a slight difference between the contents of the first copy and of the second copy. This fact therefore required an increase in the capacity of buffer memory or storage and to a lowered output due to the time loss required for data transfer. For the case of an off-line printer, the data recording has to be conducted by memorizing the data for the first copy and those for the second copy separately into the page buffer from a data file such as a magnetic tape, and such process is quite wasteful and inefficient despite the fact that the masking is required only in a very small portion of the data to be recorded. Thus complication of the apparatus and an increase in the cost are unavoidable if it is necessary to increase or decrease the masked portion.

Such a drawback is not limited only to a laser beam printer but also plagues any non-impact printer or data output device.

SUMMARY OF THE INVENTION

The object of the present invention is therefore to provide a novel data output apparatus capable of avoiding the drawback in the conventional technology as described above and of realizing masking of arbitrary data selected from a data group.

More specifically the present invention is directed to providing a data output apparatus having with a first data memory and a separate second memory utilized for storing masking instruction codes, a masking instruction being obtained from the second memory during the readout from the data memory to control the output from the data memory.

BRIEF DESCRIPTION OF THE DRAWINGS

FIG. 1 is a perspective view of a laser beam recording apparatus wherein the present invention is applicable;

FIG. 2 is a side elevation of the principal part of the laser beam recording apparatus shown in FIG. 1;

FIGS. 4A and 4B illustrate the patterns recorded on a recording sheet with the data processing apparatus of FIG. 3; while FIGS. 4C and 4D illustrate the contents of the page buffer memory shown in FIG. 3;

FIG. 5 illustrates the data stored in the page buffer memories 114 and 115 shown in FIG. 3;

FIGS. 8-10 illustrate the data stored in the page buffers 114, 115;

FIG. 13 is an explanatory view illustrating a special pattern;

FIG. 17 is a block diagram of a circuit for instructing the masking in the selected portion of the data to be recorded.

DESCRIPTION OF PREFERRED EMBODIMENTS

In the following there will be given a detailed explanation on the data processing apparatus of the present invention, while referring to the accompanying drawings.

Figure 3B:
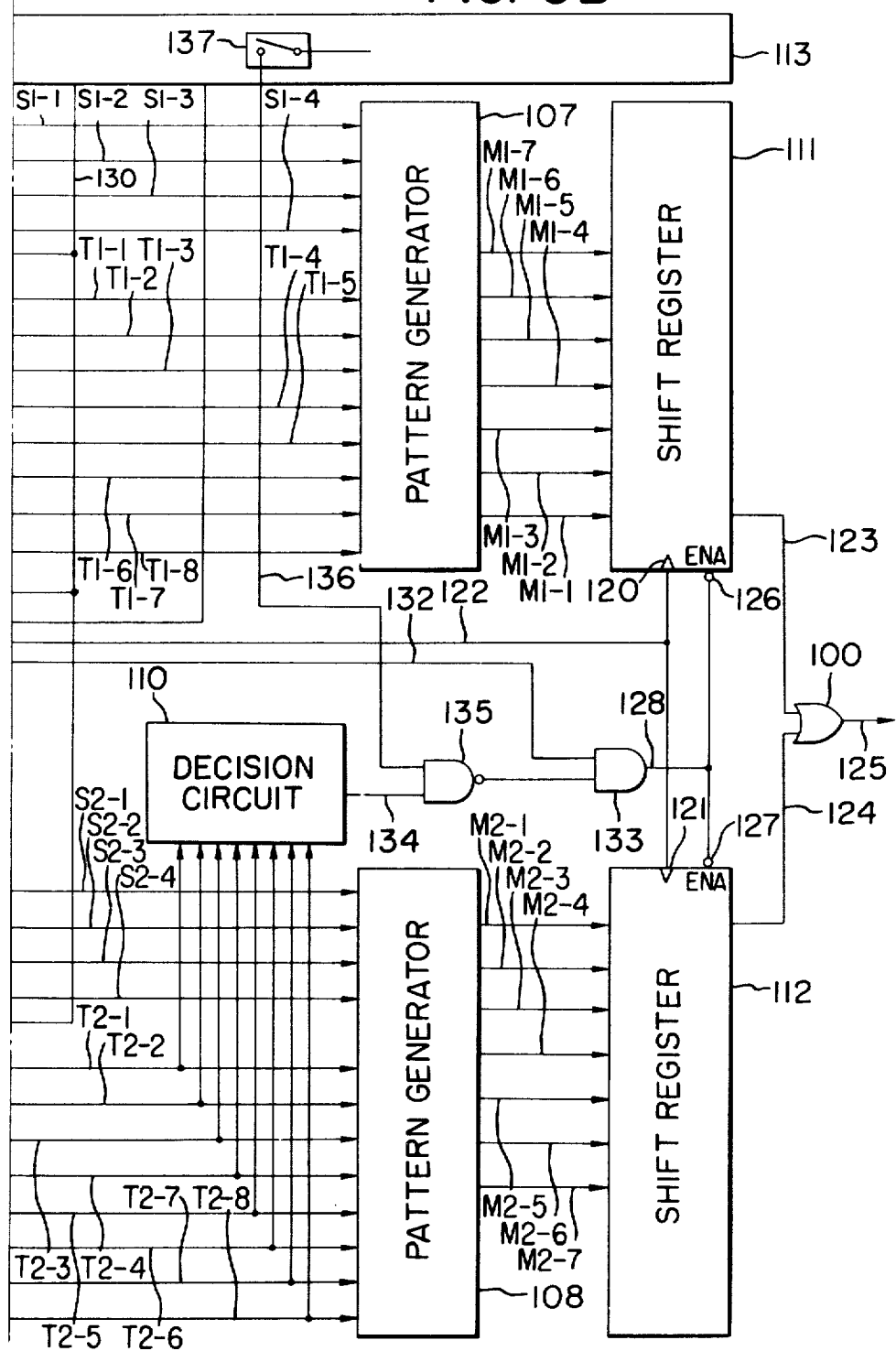
FIG 3 is a diagram of the relative positions in FIGS. 3A and 3B.
FIGS. 3A and B illustrate a circuit block diagram of the data processing apparatus of the present invention.

FIGS. 3A and 3B illustrate a circuit block diagram of an embodiment of the data processor of the present invention, the circuit being specifically adapted for generating an image or character signal by raster scan method to provide modulation control signals for the modulator 3 of the laser beam printer shown in FIG. 1.

In the laser beam printer shown in FIG. 1, the spot formed by the laser beam 12, placed in repeated sweeping motion on the photosensitive drum 8, is subjected to auxiliary scanning realized by the rotation of drum 8 and also to a modulation corresponding to each scanning position thereby to achieve the recording or desired characters or symbols. For the purpose of such recording, each character, symbol or form is given by a corresponding code signal, which is applied to a pattern generator to be converted into a pattern composed of for example 84 dots consisting of 12 rows × 7 columns.

Figure 4A:
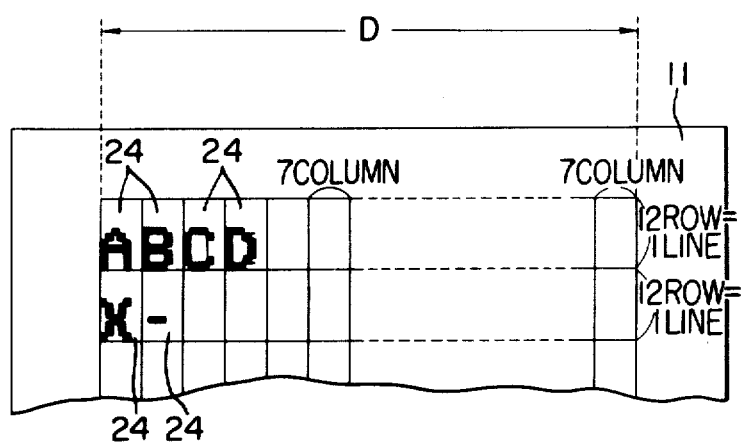
Figure 4B:
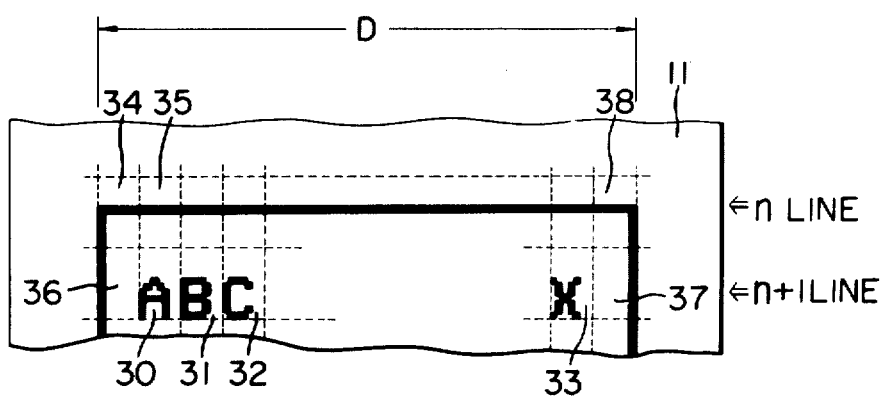

Consequently on the transfer sheet 11 to which the pattern formed on the photosensitive drum is transferred, the recording is obtained as illustrated in FIGS. 4A and 4B, and each code signal corresponds to each of the patterns 24, 30-37.

Thus assuming that one line contains n patterns, the readout of n code signals has to be conducted during a single scanning of the laser beam across the photosensitive drum, and 12n readouts of code signals are required for completing the recording of one line.

Referring to FIG. 3 illustrating the data processing apparatus of the present invention, numerals 114 and 115 designate page buffer memories (hereinafter referred to as PBFs) each capable of storing information, in the form of code signals, corresponding to one page of for example A4-sized recording sheet capable of accommodating 132 lines, wherein each line is capable of accommodating 272 patterns.

PBF 114 is principally utilized for the storage of code signals of data, while PBF 115 is utilized for the storage of code signals of the format to be recorded superimposingly with the data and of masking code signals for masking the selected portions in the data code signals.

For example, in case it is not desired to record the data in the area 114-1 in the PBF 114 shown in FIG. 3, a masking code signal (for example "11111111") is stored in an area 115-1 of PBF 115 corresponding to area 114-1. Also in case area 114-1 contains plural pattern sections, the masking code signal is stored in each of plural sections in 115-1 corresponding to the plural pattern sections.

PBF's 114, 115 are composed of semi-conductor memories in the present embodiment, but any other random access memories (RAM) satisfying the necessary access time can also be utilized for this purpose.

For the purpose of clarification, the data information (data code signal) means the data to be recorded, for example output data from the computer, as illustrated in FIG. 5(1), while the format information, which is also a data code signal, means the forms composed of frames and titles as shown in FIG. 5(2) and corresponding to preprinted forms in the conventional line printer.

PBF's 114, 115 are respectively provided with address devices 116, 117 to store information from the input lines Li1 and Li2 into the address designated by the address devices and to release the content of such an address to the output line Lo1 or Lo2.

Such address devices 116, 117 are designed to be either simultaneously or separately operable. In the present embodiment, the writein into the PBF's 114, 115 is conducted for a unit of one page while the read-out therefrom is conducted for a unit of one line. As explained in the foregoing, the information corresponding to one page is supplied in succession to input lines Li1 and Li2, and such supply can be achieved in such a manner, as described in the U.S. patent application Ser. No. 616,675, that, among the information obtained from a magnetic tape, the data information is supplied to the input line Li1 while the format information is supplied to the input line Li2.

In a variation as described in the U.S. patent application Ser. No. 719,677 assigned to the assignee of the present application, the data information is supplied from a first magnetic tape to the input line Li1 while the format information is supplied from a second magnetic tape to the input line Li2.

The signals released to the output lines Lo1 and Lo2 are respectively guided to the signal lines L1 and L2 and applied respectively to the first and second memories 101, 102.

Each of the first and second memories has a capacity capable for memorizing information of one line (272 code signals corresponding to 272 patterns) and provides a parallel output of bit signals constituting one code signal (composed of 8 bits in the present embodiment) to the output lines T1-1 to T1-8 and T2-1 to T2-8.

Address circuits 103 and 104 instruct the storage of information from the signal lines L1, L2 into the first and second memories, or the successive readouts of code signals from the first and second memories.

Thus, a signal supplied through the signal line 130 is applied to address devices 116, 117 and also to address circuits 103, 104 thereby instructing the writein of code signals of one line from PBF's 114, 115 simultaneously into the first and second memories 101, 102, and, upon each receipt of the signal from the signal line 131, the read-out of one code signal (consisting of 8 bits) from first and second memories 101, 102.

The signal to the signal line 130 is the vertical synchronizing signal applied to the terminal 129 and supplied through a control circuit 113, and is generated upon each completion of recording of one line consisting of 12 rows and applied to the terminal 129 upon counting of every 12 horizontal synchronizing signals by a non-illustrated device.

The signal to signal line 131 is generated by the control circuit 109 upon counting of every 7 clock signals (one clock corresponding to one dot in FIG. 4) from a clock generator 109-1, such as Model 115 by Wavetec Corp., included in the control circuit 109 by means of a counter 109-2, such as SN74161N by Texas Instruments, Inc., also included in circuit 109.

Also control circuit 109 generates, on the signal line 132, a control signal which assumes a high level during a period corresponding to the recording areas D (FIG. 4) (in the case of a line of the present embodiment containing 272 patterns each occupying 7 columns, the period corresponds to 272×7 columns or 272×7 clock pulses as each column is represented by a clock signal) and a low level in other periods thereby applying a high level signal to an AND gate 133 during the former period.

Also row address indicators 105 and 106, such as SN74161N manufactured by Texas Instruments, Inc., indicate the currently scanned row within a given line. Row indicators 105, 106 respectively receive the horizontal synchronizing signal (which is a standard signal generated by the beam detector 18 in FIG. 1 upon each horizontal scan of the beam) applied to the terminal 118 of the control circuit 119 and supplied through the control circuit 109 and the signal line 119, and are composed of counter counting such synchronizing signals to a number of rows in a line.

In the present embodiment wherein one line is composed of 12 rows, the row address counters count from 1 to 12 and generate the result of counting as a 4-bit parallel output to the output lines S1-1, to S1-4 and to S2-1 to S2-4, and return to '1' after reaching '12'.

Figure 6:
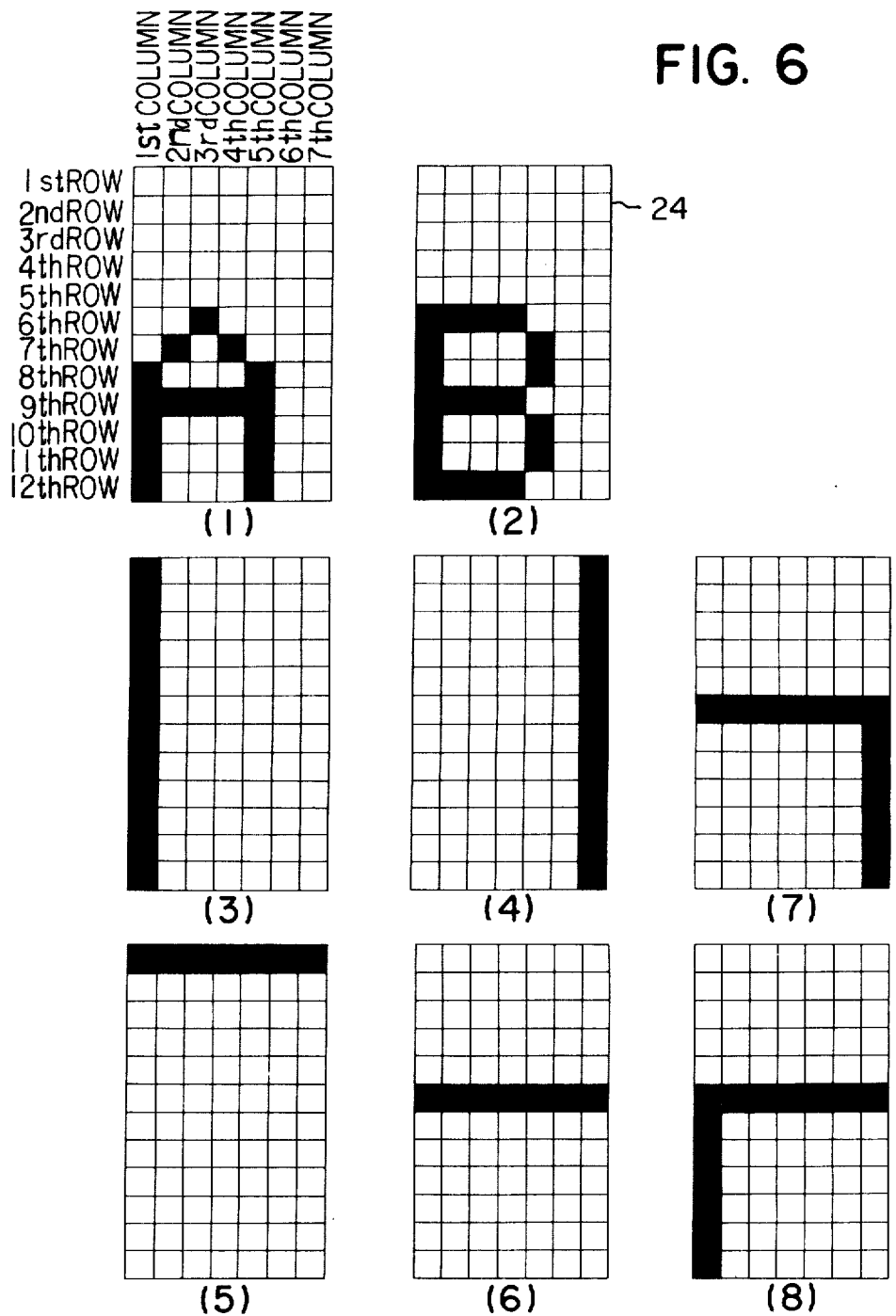
FIG. 6 illustrates various information patterns.

A pattern generator 107, such as integrated circuit MCM 6571L manufactured by Motorola Semi-conductor Corporation, memorizes a plurality of patterns necessary for the data indication as illustrated in FIG. 6, views (1) and (2), and which provides parallel outputs, to the output lines M1-1 to M1-8, of the bit signals corresponding to the pattern instructed by the code signal supplied by the output lines T1-1 to T1-8 and also corresponding to the bit signals of a row supplied by the output lines S1-1 and S1-4.

For example in case a code signal indicating a pattern "A", as illustrated in FIG. 6 (1), is supplied through the output lines T1-1 to T1-8 and a signal indicating the 7th row is supplied through the output lines S1-1 to S1-4, bit signals "0101000" (wherein 1 and 0 respectively indicate black and white portions in FIG. 6) are supplied to the output lines M1-1 to M1-7.

A pattern generator 108 is similar to 107, i.e. such as integrated circuit MCM 6571L by Motorola Semiconductor Corporation, memorizing a plurality of patterns necessary for the indication of format as illustrated in FIG. 6, views (3), (4), (5), (6), (7) and (8) and functioning to provide parallel outputs of bit signals, to the output lines M2-1 to M2-7, corresponding to a pattern of code signal supplied through the output lines T2-1 to T2-8 and also corresponding to the row designated by the signal through the output lines S2-1 to S2-4.

For example in case a code signal indicating a pattern as illustrated in FIG. 6 (5) is supplied through the output lines T2-1 to T2-8 and a signal indicating the first row is supplied through the output lines S2-1 to S2-4, there will be generated a signal "1111111" to the output lines M2-1 to M2-7.

Pattern generator 108 is also designed to receive a masking code signal (11111111) through the output lines T2-1 to T2-8, and is designed, upon receipt of such a masking signal, to provide '0' to all the lines M2-1 to M2-7 (pattern signal for absence of information). It is further to be noted that such signal is not necessarily limited to "11111111" but can be any other code signal not allotted to the pattern generation on pattern generator 108.

111 is a shift register such as component SN74161N by Texas Instruments, Inc., functioning as a parallel-serial converter for converting the parallel bit signals applied through the output lines M1-1 to M1-7 to serial signals for bit-by-bit readout, and receives the clock signals (frequency 5 MHz) generated by a clock generator 109-1 in the control circuit 109 at a terminal 120 through a signal line 122, thereby applying bit signals in succession to an output line 123 starting from the M1-1 side. In the foregoing example, therefore, a bit signal "0" is supplied to the output line 123 upon receipt of a first clock, then a bit signal "1" upon receipt of the second clock, further a bit signal "0" upon receipt of the third clock, and the readout proceeds in this manner.

Also a similar shift register 112, such as component SN74161N by Texas Instruments, Inc., functions to supply bit signals to an output line 124 starting from the M2-1 side upon receipt of clock signals at the terminal 121 through the signal line 122.

An OR circuit 100 receives the inputs from output lines 123, 124, and the signal obtained by the addition in OR circuit 100 is supplied through an output line 125 and further supplied as a modulation signal to the modulator 3 in FIG. 1 for laser beam modulation.

Shift registers 121, 122 are respectively provided with enable terminals 126, 127 which, upon receipt of a high or low level signal through a signal line 128, respectively enables or forbids the writein of bit signals supplied through the output lines M1-1 to M1-7 and M2-1 to M2-7 into shift registers 111, 112.

A judging or decision circuit 110, such as code identifier unit 162,168 or 178 of U.S. Pat. No. 3,921,148, judging the masking code identifies whether the code signal from the second memory 102 is a masking code (for example "11111111") or not and correspondingly generates a high or low level signal to a signal line 134, which is connected to an input terminal of a NAND gate 135. The other input terminal of the gate receives the masking control signal through a signal line 136 from the control circuit 113.

Control circuit 113 is therein provided with a control signal generator 137 such as a switch or a flip-flop, which generates a high or low level signal respectively in a first mode for masking instruction (switch ON) or in a second mode for no masking instruction (switch OFF).

Thus if switch 137 is composed, as shown in FIG. 17, of a flip-flop 137-1 of which set output terminal is connected to a signal line 136 while the set input terminal thereof is connected to the output of a counter 137-2, it becomes possible to obtain a desired number of masked copies for any predetermined number of copies.

Counter 137-2 receives the pulse signals each generated at completion of every 132 vertical synchronizing signals (i.e. at completion of recording of one sheet) and counts the pulses up to 5 (in case of preparing 5 copies). The output of count 1 is supplied to the set input Si of flip-flop 137-1 while the output of count 3 is supplied to the reset input Ri of the flip-flop 137-1. In this manner the first two copies among the five copies contain all the information while the remaining three copies contain information part of which is masked in the selected portions.

In such a construction, and upon identification of a masking code signal by the judging circuit 110, the signal line 128 assumes a low level if the signal line 136 is in high level to forbid the writein of the bit signals into the shift registers 111, 112 from the output lines M1-1 to M1-7 and M2-1 to M2-7.

Inversely if the signal line is in a low level, the signal line 128 remains at a high level even at the identification of a masking code signal by the judging circuit 110 to allow normal writein of the bit signals into the shift registers 111, 112 from the output lines M1-1 to M1-7 and M2-1 to M2-7.

In the case of forming a recording on the transfer sheet 11 as shown in FIG. 4B, the code signals can be stored in PBF's 114, 115 and read therefrom simultaneously. Thus, as illustrated in FIG. 4C, a code signal "00000000" indicating the absence of information is stored in the addresses n+1 to n+273 and n+544 of the PBF 114, a code signal "00000001" indicating "A" as represented by 30 in FIG. 4B in the address n+274, a code signal "00000010" indicating "B" as represented by 31 in FIG. 4B in the address n+275, a code signal "00000011" indicating "C" as represented by 32 in FIG. 4B in the address n+276, and a code signal "00000100" indicating "X" as represented by 33 in FIG. 4B in the address n+543.

Also as illustrated in FIG. 4D, a code signal "10000110" indicating a pattern as represented by 34 in FIG. 4B (or FIG. 6(8)) in the address n+1 of PBF 115, a code signal "10000100" indicating a pattern as represented by 35 in FIG. 4B (or FIG. 6(6)) in the addresses n+2 to n+271, a code signal "10000101" indicating a pattern as represented by 38 in FIG. 4B (or FIG. 6(7)) in the address n+272, a code signal "10000001" indicating a pattern as represented by 36 in FIG. 4B (or FIG. 6(3)) in the address n+273, a code signal "10000010" indicating a pattern as represented by 37 in FIG. 4B (or FIG. 6(4)) in the address n+544, and a masking code signal "11111111" in any other addresses.

Upon giving an instruction signal to the signal line 130 while the information is stored in PBF's 114, 115 in the above-explained manner, the information of one line stored in the corresponding addresses in PBF's 114, 115 (addresses n+1 to n+272) are respectively stored in the first memory 101 and second memory 102. When the control signal generator 137 does not instruct the masking, a readout signal applied to the signal line 131 while a low level signal is applied to the signal line 136 causes the readout of the information simultaneously from the first memory 101 and second memory 102, the information being simultaneously supplied to the pattern generators 107, 108. The enable terminal is given a high level signal regardless of the output of judging circuit 110 since the signal line 136 is maintained at a low level. Consequently the outputs of pattern generators 107, 108 are simultaneously memorized in the shift registers 111, 112, then simultaneously taken out therefrom and added mutually in the OR circuit 100.

Upon repetition 12 times of the information corresponding to one line from the first and second memories 101, 102, the information corresponding to a succeeding line is transferred from the PBF's 114, 115 to the first and second memories 101, 102, and an output signal obtained by the addition in the OR gate 100 in the above-explained manner.

Although it is assumed that the (n+1)-th line in the second memory 102 contains masking code signals, since the signal line 136 is maintained at the low level as explained above, the masking code signal does not perform any function but is simply converted in the pattern generator 108 into a pattern signal indicating the absence of information, i.e. a signal wherein all the bits are zero. In this manner, therefore, there will be obtained a recording as shown in FIG. 4B on the recording sheet 11.

In case a masking is conducted in the recording of data (ABC . . . X) shown in FIG. 4B, the control signal generator 137 is placed in the first mode to maintain the signal line 136 at the high level potential.

In the following there will be given an explanation on the procedure of writein of information of n-th line from the PBF's 114, 115 into the first and second memories 101, 102 followed by conversion into pattern code which is forwarded through the OR circuit 100, and of writein of information of (n+1)-th line into the first and second memories 101, 102 for the readout of second pattern in the succeeding line.

The second information in the (n+1)-th line is "00000001" in the first memory 101 and, in the second memory 102, is "11111111" which is the masking code signal. The code signals are respectively supplied to the pattern generator 107, 108 which in turn generate, respectively, a pattern signal for the data "A" and a pattern signal of all "0" indicating the absence of information.

On the other hand the code signal obtained from the second memory 102 is supplied to the judging circuit 110 which provides a high level signal to the signal line 134 upon identifying the code signal as the masking code signal. Consequently the output of the AND gate 135 changes to the low level to place the signal line 128 at the low level potential.

As explained above the output lines M1-1 to M1-7 of the pattern generator 107 are receiving the bit outputs corresponding to the pattern "A" while the output lines M2-1 to M2-7 of the pattern generator 108 are receiving bit outputs of all zero, but the shift registers 111, 112 do not perform the information writein since the enable terminals 126, 127 are given low level signals. In such a state, therefore, no information is stored in the shift registers 111, 112.

In such a state, even upon receipt of seven clock pulses at the terminals 120, 121, there will only be given seven "0" signals on the output lines 123, 124. Stated differently, the information regarding data "A" obtained from the pattern generator 107 is masked and is not recorded as output.

Upon repetition 12 times of the readout of information belonging to the (n+1)-th line in this manner, there will be completed the recording of the (n+1)-th line wherein the patterns 30, 31, 32 and 33 in FIG. 4B are masked to only leave the format information composed of a pair of straight lines (See FIG. 4B).

For further clarification, assuming that the PBF 114 memorizes the data of one page as illustrated in FIG. 5(1) and the PBF 115 memorizes the data of one page as illustrated in FIG. 5(2), simultaneous actuation of the first and second memories 101, 102, pattern generators 107, 108 and shift registers 111, 112 cause superposition of the two data to give a single information recorded on the recording sheet 11 as illustrated in FIG. 8.

Figure 10:
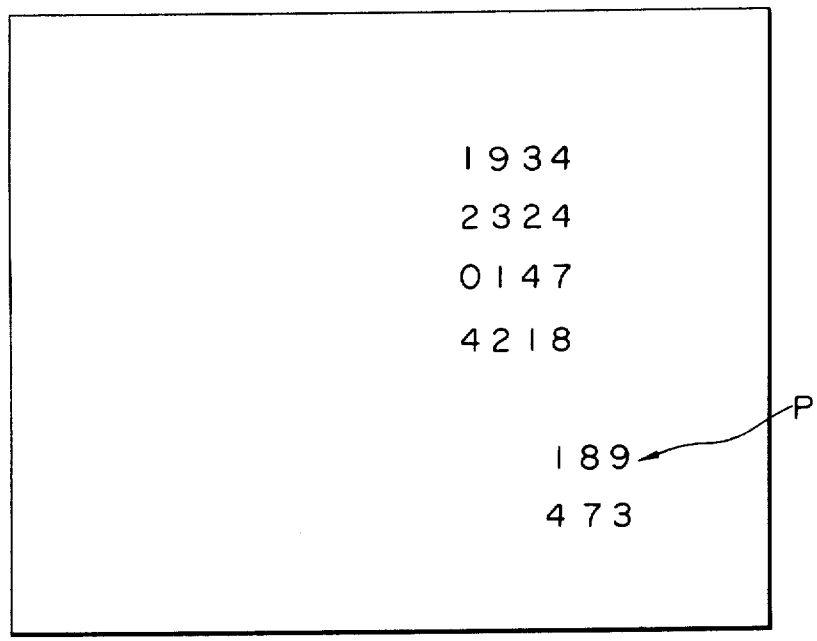

Now, in case it is desired to obtain a recording as shown in FIG. 9 by applying a masking on the data of FIG. 10(1) in the position P therein, such a masked copy can be obtained by writing special masking code 6 (11111111) in the position T in the format information shown in FIG. 10(2) corresponding to the position P in FIG. 10(1). The special masking code signal, upon output from the second memory 102, is detected by the judging circuit (masking decoder) 110 which thereupon generates "1" output. Such a masking code detection signal is supplied, according to the masking instruction from the control circuit 113 and in synchronization with the timing pulse on the signal line 132, to the enable terminals 126, 127 of first and second shift registers 111, 112 to interrupt the writein of information from the first and second pattern generators 107, 108 respectively into shift registers 111, 112. Consequently the data obtained from the first memory 101 simultaneously with the masking code is not memorized in the shift register 111 and is accordingly not recorded. Also the masking code from the second memory 102 is also supplied to the second pattern generator 108, but no recording signal output is obtained from the OR gate 100 since the pattern signal corresponding to the masking code is at the same time interrupted. The masking is controlled by the instruction from the control circuit 113, and is not performed when there is no masking instruction from the control circuit 113 through the signal line 136 even if a masking code is detected. Such a masking instruction is given by a switch 137 on the panel or from a magnetic tape or a host computer. Suitable control of such masking instructions permits in a very simple manner to obtain the copies in two different modes, for example two unmasked copies combined with one masked copy.

Now there will be given an explanation of the timing program of the foregoing circuit, while referring to the timing diagram shown in FIG. 7.

Figure 7:
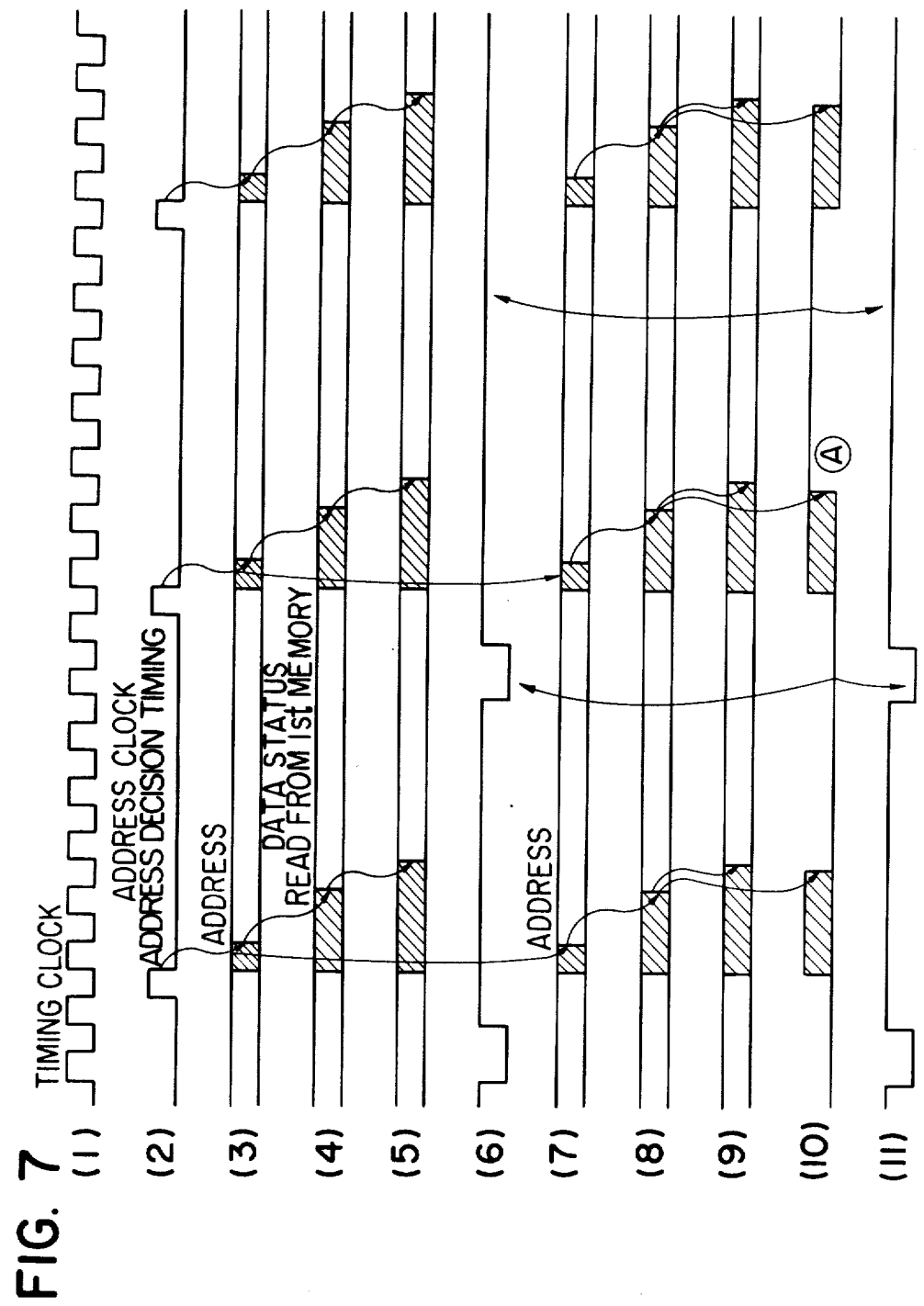
FIG. 7 is a timing diagram for explaining the function of the data processing apparatus shown in FIG. 3.

Referring to FIG. 7, plot (1) indicates the timing clocks obtained from the clock generator 109-3 for determining all the timing of the circuit entire device, plot (2) indicates the timing of the address determination of first and second memories 101, 102 by the addressing circuits 103, 104, plot (3) indicates the time required for the actual address determination of first memory 101 by the addressing circuit 103 according to the timing (2), wherein the hatched area indicates the uncertain area resulting from delay in the IC. Also plot (7) indicates the actual address determination time of the second memory by addressing circuit 104. Plot (4) indicates the data readout time from an address of the first memory 101 designated by addressing circuit 103, plot (8) indicates the data readout time from an address of the second memory 102 designated by addressing circuit 104, plot (5) indicates the pattern information output time from pattern generator 107 according to the information received from the first memory 101 and to the instruction of first row addressing instructor 105, and plot (9) likewise indicates the pattern information output time from the second pattern generator 108 in similar manner. Also plot (6) indicates the timing of loading the pattern information obtained from the pattern generator 107 into the shift register 111 (which however is supposed to be of synchronous loading type), plot (11) likewise indicates the timing of loading the pattern information into the shift register 112, and plot (10) indicates the output timing from the judging circuit 110. Now there will be considered a situation wherein the control circuit 113 demands the output of masked information and the output of judging circuit 110 has changed to high level (i.e. masking code being decoded) at the point A in FIG. 7(10). In such an instance, as shown by plots (6) and (10) in FIG. 7, the input of pattern information into the shift registers 111, 112 is allowed prior to the point A but is interrupted at the point A to forbid the output of information to be masked.

By suitably selecting an empty code (a code not corresponding to character or pattern in the code system) for the special code for masking, it is then rendered possible to treat the special code in the same manner as the 6 (blank) code upon input into the pattern generators 107, 108 and thus to prevent undesirable recording of a pattern generated by the pattern generator 108 corresponding to the special code in the absence of the masking instruction.

As in detail explained in the foregoing, the composition of the present invention provides a novel data processing apparatus allowing multiple copies, particularly masked multiple copies with an extremely simple structure and with a non-impact printer which is unable to prepare carbon copies.

Figure 11:
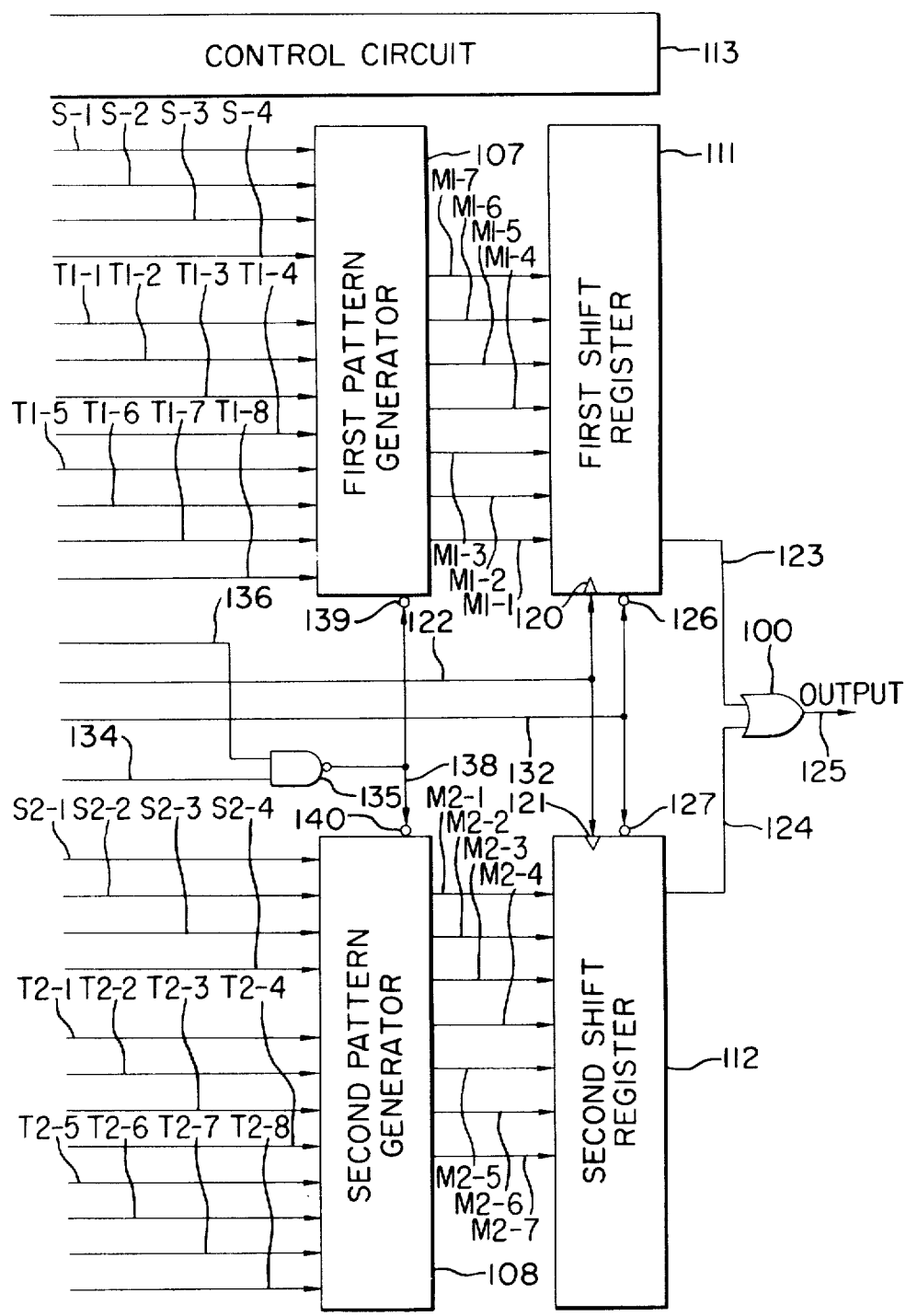
FIGS. 11 and 12 are block diagrams illustrating other embodiments of the data processing apparatus of the present invention.

Although the embodiment shown in FIG. 3 employs the input control of the shift registers for the partial erasure of the data obtained from the pattern generators, it is also possible to control the pattern signal generation from the first and second pattern generators 107, 108, as illustrated in FIG. 11. More specifically the IC pattern generators 107, 108, being provided with chip select terminals 139, 140, perform the writein of the code signals supplied through the output lines T1-1 to T1-8 and T2-1 to T2-8 to generate pattern signals to the output lines M1-1 to M1-7 and M2-1 to M2-7 when select terminals 139, 140 are maintained at a high level, while they do not generate pattern signals but simply provide "0" signals to all output lines even upon writein of the code signals from the output lines T1-1 to T1-8 and T2-1 to T2-8 when the select terminals are at a low level. Thus, by connecting the output of NAND circuit 135 to the signal line 138, the pattern generators 107, 108 function normally to generate pattern signals to the output lines thereof when a low level signal is applied to the signal line 136. On the other hand, in the state wherein a high level signal is applied to the signal line 136, the pattern generators 107, 108 perform normal function when the judging circuit 110 does not detect the masking code, but they do not provide pattern signals, thus supplying "0" signals to all the output lines thereof, when judging circuit 110 detects a masking code. In this manner the information becomes masked, achieving a similar function as in the apparatus of FIG. 3.

In these drawings the like components are represented by a common number and have the same function, and the portions not illustrated in FIG. 11 are constructed in the similar manner as in FIG. 3.

Although the data corresponding to masking code signals are masked and not recorded in the foregoing embodiments, it is further possible, according to the present invention, to mask the data by means of the masking code signals and to insert in thus masked positions another markings indicating the presence of data masking, such as patterns as illustrated in FIG. 13 A, B or C.

Figure 12:
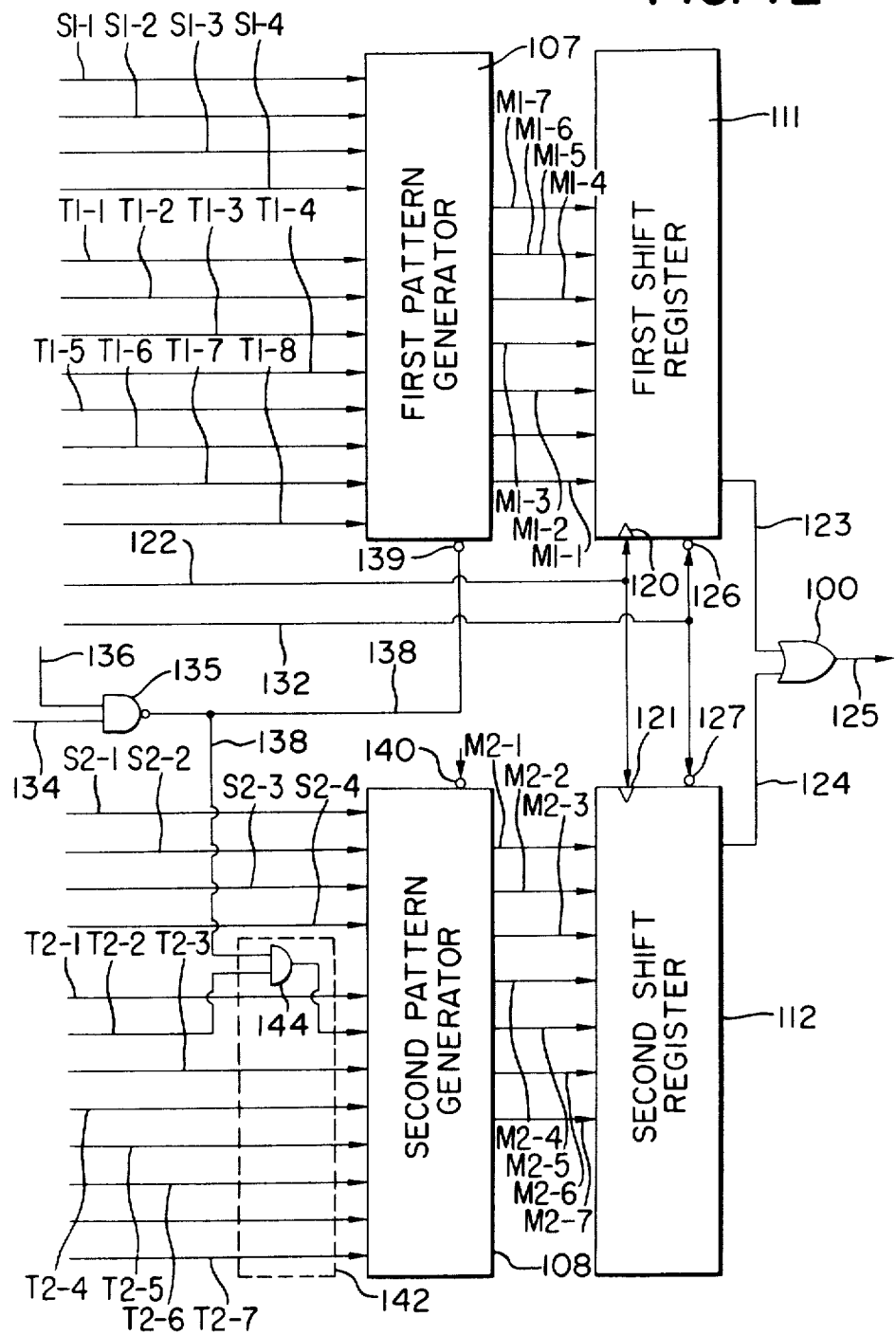

FIG. 12 indicates an apparatus obtained by certain modification in the apparatus of FIG. 11 and capable of realizing other recordings in the masked positions.

In the apparatus the output of the second memory 102 is supplied to a code converter 142, of which output is in turn supplied to the pattern generator 108, and the select terminal 140 is constantly given a high level signal from an unillustrated circuit.

Code converter 142 is structured to perform no converting function to forward the code signals from the second memory 102 to the pattern generator 108 without conversion when the signal line 138 is given a high level signal while it performs a conversion of masking code signal (for example "11111111") into an another particular code signal (for example "10111111") upon receipt of a low level signal on the signal line 138.

Furthermore, in the apparatus of FIG. 12, the output line T2-2 is connected to an input terminal of an AND gate 144 of which the other input terminal is supplied with the output of the NAND gate 135 and of which output is supplied to the pattern generator 108 in place of output line T2-2.

Thus, by designing the pattern generator 108 so as to generate particular pattern signals as exemplified by FIG. 13A, 13B or 13C upon receipt of the converted code signal "10111111", the data received from the first memory 101 is not recorded but is replaced by such particular pattern only when a masking code signal is identified by the judging circuit 110 and a high level signal is given to the signal line 136. Also in such an apparatus the code converter 142 does not perform any function so long as the signal line 138 receives a high level potential.

In FIG. 12, the like components are represented by the same numerals as in FIG. 11 and perform the same function therein, and unillustrated portions are constructed in the same manner as in FIG. 11.

Figure 14:
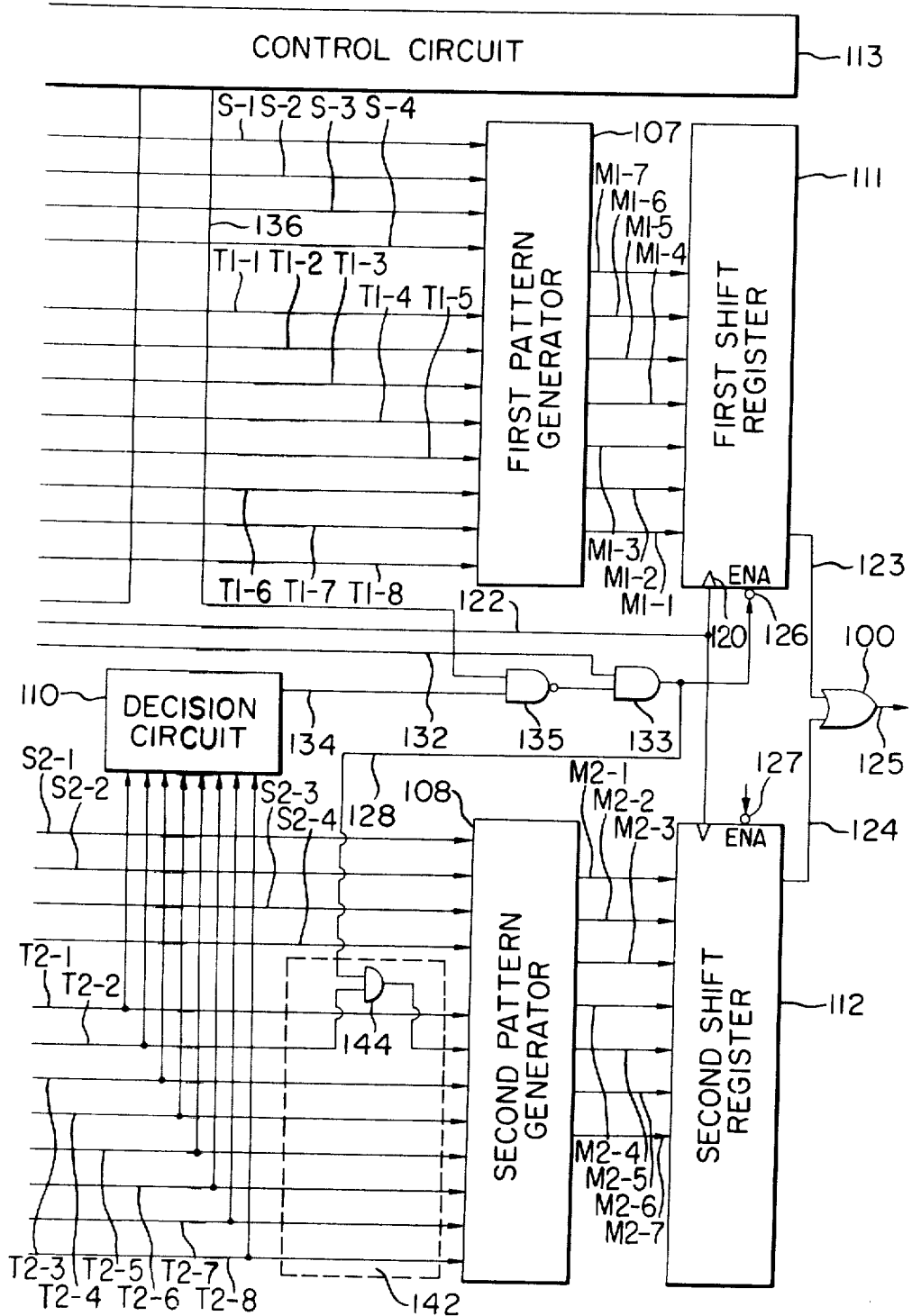
FIGS. 14-16 are block diagrams of other embodiments of the data processor of the present invention.

Furthermore the function of the apparatus of FIG. 12 can be achieved by the apparatus illustrated in FIG. 14 with certain modification of the apparatus in FIG. 3, wherein the unillustrated portions are constructed in the same manner as in FIG. 3.

In such an apparatus a code converter 142 as explained above is inserted into a part of the output lines T2-1 to T2-8 and the signal line 128 is connected to an input terminal of an AND gate constituting a part of the code converter 142, and a high level signal is constantly given to the enable terminal 127. The apparatus thus constructed is capable of performing the same function as in the apparatus of FIG. 12.

Figure 15:
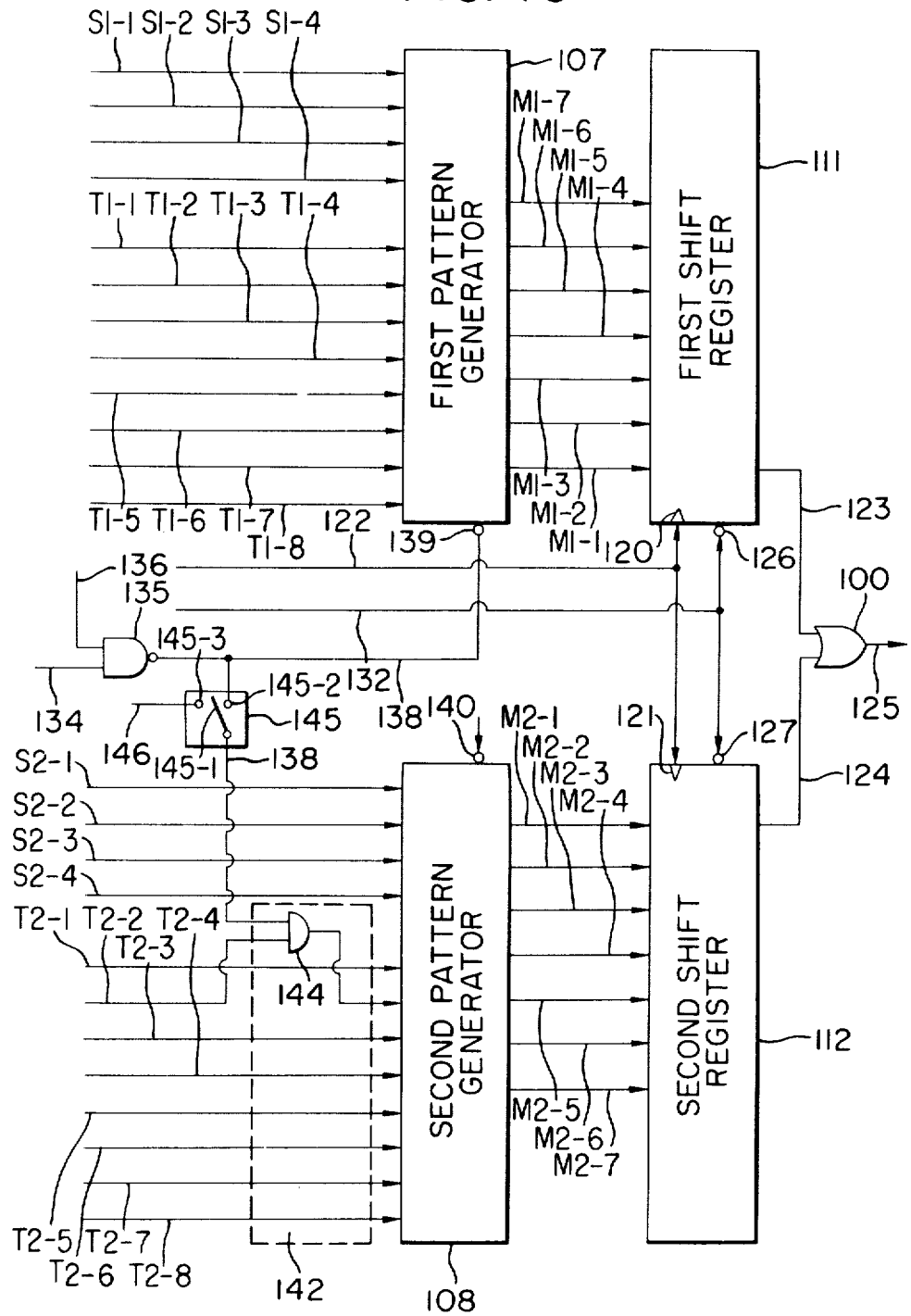

Furthermore in the apparatus shown in FIG. 15, by providing a switch 145 of which switching element 145-1 is switchable between the contacts 145-2 and 145-3 of which the former constantly receives a high level signal through the signal line 146, it is rendered possible to arbitrarily select whether the data is erased by the masking code signal or replaced by as another particular pattern as illustrated in FIG. 13.

In case the element 145-1 is in contact with the contact 145-2, the entire circuit is identical with that represented in FIG. 12, thus performing the masking of data and insertion of a particular pattern in thus masked positions when the NAND gate generates a low level signal. On the other hand, in case the element 145-1 is in contact with the contact 145-3, the function of code converter 142 is constantly suppressed and the masking code signals are supplied directly to the pattern generator 108 with a low level output of NAND gate 135, giving rise to all zero outputs from the OR circuit 100.

Figure 16:
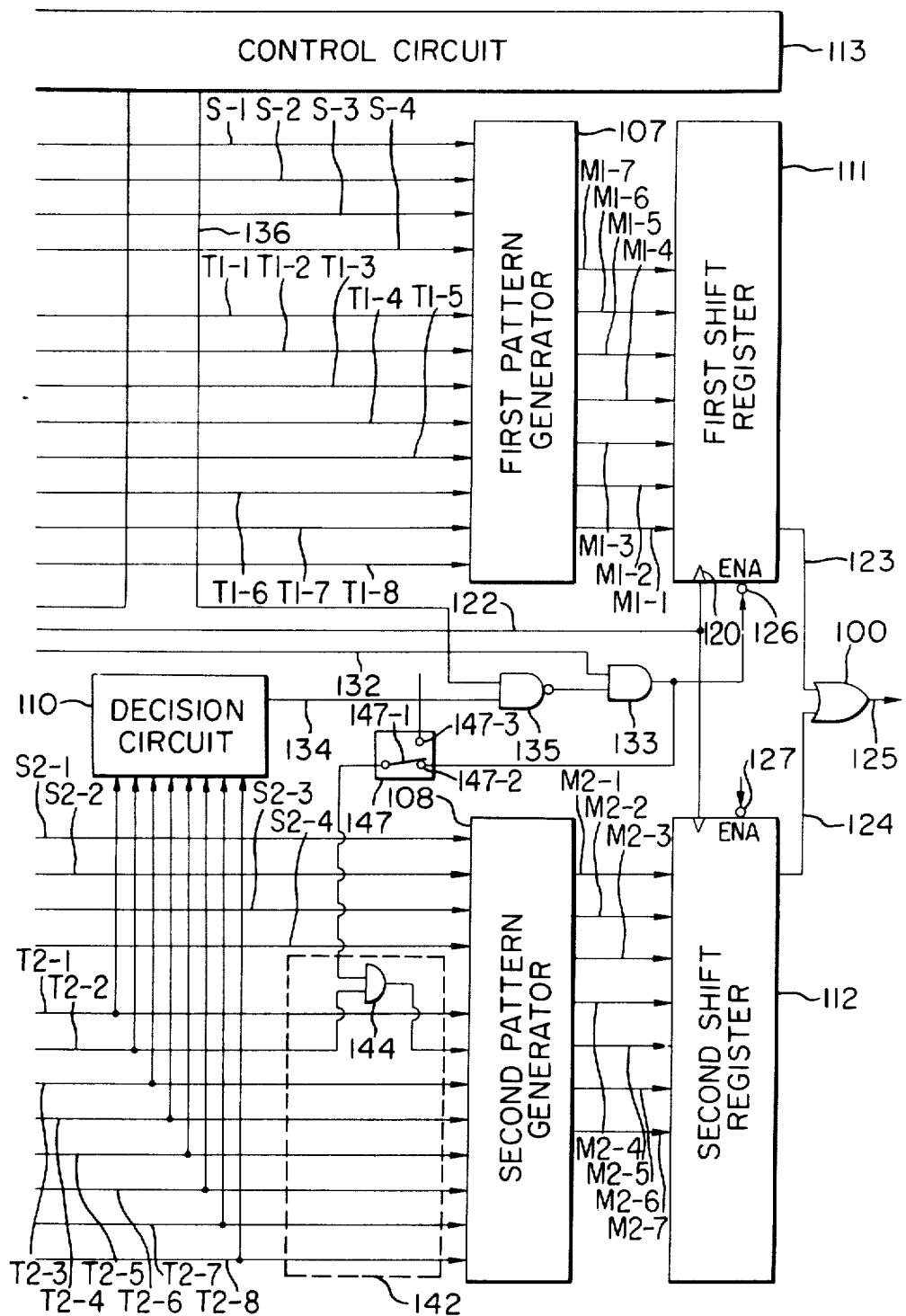

Likewise, by inserting in the circuit of FIG. 14 a switch 147 into a part of signal line 128 and constantly providing a high level signal to the contact 147-3 as illustrated in FIG. 16, the data masking without the generation of the particular pattern is rendered possible by contacting the element 147-1 with the contact 147-3.

In the foregoing embodiments, it will be understood that the roles of first and second memories can be exchanged without any problem. Further, masking of the content of the second memory is also possible by providing a masking code decoder in the first memory system in addition to the second memory system. Although the first and second memories are designed for storing data and format information of one line, the present invention is applicable also when the memories are for one character or for one page.

Furthermore, the data output control for masking can be achieved not only by the control of pattern generators or shift registers but also by the direct control of the output of the shift registers.

Furthermore, in the foregoing embodiments the masking is achieved by controlling the output of data to be masked, but a similar effect can also be obtained by leaving the data to be masked unaffected and simultaneously superimposing another pattern which will, for example, give a totally blacked-out pattern. Such a purpose can be easily achieved by supplying the logic addition of output of judging circuit 110 and masking instruction from the controller 113 into the OR gate 100 and supplying a totally blacked-out recording data into the gate 100 during the output of signal to be masked from the shift register 111.

Furthermore, although the special masking codes are stored in the memory for format information in the foregoing embodiments, such a format memory is not essential but can be replaced by a memory exclusive for the masking special codes for the purpose of the present invention.

In such composition the pattern generator 108 and shift register 112 in FIG. 3 can be dispensed with to achieve a very simple circuit.

Furthermore the present invention is not limited to recording devices but can be employed in various purposes such as in display devices or data transmission devices.

What is claimed is:

1. A data masking device for use in a system for visualizing output data, comprising:

first memory means having a predetermined unit memory capacity for storing information code signals which are convertible into visible information;

second memory means having at least said predetermined unit memory capacity for storing specific code signals corresponding to information code signals stored in said first memory means which are not to be converted into visible information;

read-out means connected to said first and second memory means for simultaneously reading out the code signals from said first and second memory means;

output means responsive to the information code signals read out by said read-out means for establishing information code patterns corresponding to the read out information code signals and for converting the information code patterns into visible information;

detection means connected to said read-out means for detecting the presence of a specific code signal in the code signals read out by said read-out means; and control means, responsive to the detection by said detection means of the presence of a specific code signal, for controlling said output means to prevent conversion into visible information of the information code patterns corresponding to the information code signal which has been read out simultaneously with the detected specific code signal.

2. A data masking device in accordance with claim 1, wherein said output means comprises information signal output means responsive to the information code signals read out by said read-out means for establishing information pattern signals corresponding to the read out information code signals, and visible information output means connected to said information signal output means for converting the information pattern signals into visible information.

3. A data masking device in accordance with claim 2, wherein said information signal output means comprises pattern generator means responsive to the information code signals, for generating, in parallel, pattern signals corresponding to the information code signals, and converter means connected to said pattern generator means for converting the pattern signals into serial information pattern signals.

4. A data masking device in accordance with claim 3, wherein said control means controls the application of the pattern signals generated from said pattern generator means to said converter means.

5. A data masking device in accordance with claim 3, wherein said control means controls the generation of the pattern signals in said pattern generator means.

6. A data masking device, for use in a system for visualizing output data, comprising:

first memory means for storing first information code signals which are to be converted into visible information, and second information code signals which are to be selectively converted into visible information;

second memory means for storing specific code signals corresponding to the second information code signals stored in said first memory means;

read-out means connected to said first and second memory means for reading out simultaneously the code signals from said first and second memory means;

output means responsive to the first and second information code signals read out by said read-out means for forming visible information as an output from the read out first and second information code signals;

detection means connected to said read-out means for detecting the presence of a specific code signal in the code signals read out by said read-out means;

instruction means for selecting between a mask mode in which the output from said output means is masked and an unmask mode in which the output from said output means is not masked; and control means for controlling said output means, said control means being responsive to a detection of the presence of a specific code signal when the mask mode has been selected by said instruction means, to inhibit said output means from converting into visible information the second information signal simultaneously read out with the detected specific code signal, and being responsive to a detection of the presence of a specific code signal when the unmask mode has been selected by said instruction means, to permit said output means to convert the first and second information code signals into visible information regardless of any detection by said detection means.

7. A data masking device in accordance with claim 6, wherein said control means comprises a logic gate having inputs connected to outputs from said detection means and said instruction means.

8. A data masking device in accordance with claim 7, wherein said instruction means comprises switching means.

9. A data masking device in accordance with claim 6, wherein said output means comprises information signal output means responsive to the first and second information code signals read out by said read-out means for establishing information pattern signals corresponding to the read out first and second information code signals, and visible information output means connected to said information signal output means for converting the information pattern signals into visible information.

10. A data masking device in accordance with claim 9, wherein said information signal output means comprises pattern generator means responsive to the first and second information code signals for generating, in parallel, pattern signals corresponding to the first and second information code signals, and converter means connected to said pattern generator means for converting the pattern signals into serial information pattern signals.

11. A data masking device in accordance with claim 10, wherein said control means controls the application of the pattern signals generated from said pattern generator means to said converter means.

12. A data masking device in accordance with claim 11, wherein said control means controls the generation of the pattern signals in said pattern generator means.

13. A data masking device in accordance with claim 6, wherein said detection means comprises counter means responsive to the first and second information code signals read out from said first memory means for counting synchronous signals, each of the synchronous signals being induced upon every reading out of a predetermined number of information code signals from said first memory, and a memory circuit connected to said counter means and having two distinct memory states, said memory states being changable between states when said counter means reaches a predetermined count, and wherein outputs representative of the memory states are applied to said control means.

14. A data masking device, for use in a system for visualizing output data, comprising:

memory means for storing information code signals convertible into visible information, and specific code signals, each of which is associated with one of the information code signals which is not to be converted into visible information;

read-out means connected to said memory means for reading out the information code signals and the specific code signals from said memory means;

output means responsive to the information code signals read out by said read-out means for establishing information code patterns corresponding to the read out information code signals for conversion into visible information;

detection means connected to said read-out means for detecting the presence of any of the specific code signals in the code signals read out by said read-out means; and control means responsive to a detection of the presence of a specific code signal by said detection means for controlling said output means to provide a predetermined specific code pattern instead of the information code patterns associated with the information code signal that is associated with the specific code signal detected for conversion into a visible output different from that corresponding to the associated information code patterns.

15. A data masking device in accordance with claim 14, wherein said control means comprises code converter means, responsive to the specific code signals which are read out, for converting the read out specific code signals into predetermined code signals for application to said output means.

16. A data masking device, for use in a system for visualizing output data, comprising:

memory means for storing first information code signals and second information code signals, both of which are convertible into visible information;

read-out means connected to said memory means for reading out the first and second information code signals from said memory means;

output means responsive to the first and second information code signals read out by said read-out means for establishing information pattern signals corresponding to the read out first and second information code signals and for converting the information pattern signals into visible information;

mode instruction means for selecting between a first mode in which said output means converts only the information pattern signals associated with the first information code signals into visible information and a second mode in which said output means converts the information pattern signals associated with the first information code signals and a predetermined pattern signal instead of the information pattern signals associated with the second information code signals into visible information different from the visible information produced by the first mode; and control means responsive to one of the first and second modes selected in said mode instruction means for controlling said output means in accordance with the selected mode.

17. A data masking device, for use in a system for visualizing output data, comprising:

first memory means for storing first information code signals and second information code signals, both of which are convertible into visible information;

second memory means for storing third information code signals and specific code signals to be converted into visible information, wherein the specific code signals are stored at locations corresponding to the second information code signals stored in said first memory means;

read-out means connected to said first and second memory means for reading out the first and second information code signals from said first memory means, and the third information code signals and the specific code signals from said second memory means;

output means responsive to the first, second and third information code signals read out by said read-out means for forming visible information corresponding to the information code signals read out;

detection means connected to said read-out means for detecting the presence of any of the specific code signals in the code signals read out by said read-out means; and control means, responsive to a detection of the presence of a specific code signal, by said detection means, for controlling said output means to prevent forming visible information corresponding to the second information code signals.

18. A data masking device in accordance with claim 17, wherein said output means comprises information signal output means responsive to the first, second and third information code signals read out by said read-out means for establishing information pattern signals corresponding to read out first, second and third information code signals, and visible information output means connected to said information signal output means for converting the information pattern signals into visible information.

19. A data masking device in accordance with claim 18, wherein said information signal output means comprises pattern generator means responsive to the first, second and third information code signals for generating, in parallel, pattern signals associated with the first, second and third information code signals, and converter means connected to said pattern generator means for converting the pattern signals into serial information pattern signals.

20. A data masking device in accordance with claim 19, wherein said control means controls the application of the pattern signals supplied from said pattern generator means to said converter means.

21. A data masking device in accordance with claim 20, wherein said control means controls the generation of the pattern signals in said pattern generator means.

22. A data masking device in accordance with claim 18, wherein said information signal output means comprises first information signal producing means, responsive to the first and second information code signals read out by said read-out means, for converting the read out first and second information code signals into first information pattern signals, second information signal producing means responsive to the third information code signals read out by said read-out means for converting the read out third information code signals into second information pattern signals, and summing means connected to said first and second information signal producing means for adding the first information pattern signals to the second information pattern signals.

23. A data masking device in accordance with claim 18, wherein said visible information output means comprises recording means responsive to the information pattern signals established in said information signal output means for modulating a laser beam with the information pattern signals as the beam scans a photosensitive drum to form electrostatic images on the drum.

24. A data masking device in accordance with claim 22, wherein said first information signal producing means comprises first pattern generator means responsive to the first and second information code signals read out by said read-out means for generating first pattern signals in parallel, and first converter means connected to said first pattern generator means for converting the first pattern signals into a serial arrangement to form the first information pattern signals.

25. A data masking device in accordance with claim 22, wherein said second information signal producing means comprises second pattern generator means responsive to the third information code signals read out by said read-out means for generating second pattern signals in parallel, and second converter means connected to said second pattern generator means for converting the second pattern signals into a serial arrangement to form the second information pattern signals.

26. A data masking device in accordance with claim 24, wherein said second information signal producing means comprises second pattern generator means responsive to the third information code signals read out by said read-out means for generating second pattern signals in parallel and second converter means connected to said second pattern generator means for converting the second pattern signals into a serial arrangement to form the second information pattern signals.

27. A data masking device in accordance with claim 26, wherein said first converter means comprises a first shift register and wherein said second converter means comprises a second shift register.

28. A data masking device, for use in a system for visualizing output data, comprising:

memory means for storing information to be produced as visible information;

output memory means for storing a first output number and a second output number, the first output number being representative of how many times the information stored in said memory means is to be produced as visible information and the second output number being representative of how many times the information stored in said memory means is produced as visible information with a portion thereof suppressed;

output means for receiving and converting the information into visible information corresponding to the received information; and control means for controlling said output means to cause the information stored in said memory means to be produced from said output means as many times as the first output number stored in said output memory means, and to cause the information stored in said memory means to be produced from said output means with a portion of the information suppressed as many times as the second output number stored in said output memory means.

29. A data masking device, for use in a system for visualizing output data, comprising:

memory means for storing a plurality of information signals to be produced as visible information while other information signals are suppressed from being produced as visible information;

instruction means for selecting between a first output mode and a second output mode, wherein all of the information signals read out from said memory means are produced as visible information in the first output mode while the information signals read out from said memory means, except for those information signals to be suppressed from being produced, are produced as visible information in the second output mode; and output means for producing as visible information all of the information signals read out from said memory means in response to the first output mode selected by said instruction means, and for producing as visible information the information signals read out from said memory means except those information signals to be suppressed in response to the second output mode selected by said instruction means.

* * * * *

UNITED STATES PATENT AND TRADEMARK OFFICE
CERTIFICATE OF CORRECTION

PATENT NO. : 4,241,415
DATED : December 23, 1980
INVENTOR(S) : KATSUMI MASAKI, ET AL.

It is certified that error appears in the above-identified patent and that said Letters Patent are hereby corrected as shown below:

Column 2, line 48, "8" should read --18--;

Column 2, line 66, delete "an"; insert --an-- before "electrographic";

Column 3, line 11, insert --the-- before "laser";

Column 3, line 43, insert --the-- before "buffer";

Column 3, line 66, delete "with";

Column 4, line 10, "in" should read --of--;

Column 6, line 63, "and" should read --to--;

Column 7, line 35, "applying" should read --supplying--;

Column 10, line 58, delete "circuit".

Signed and Sealed this

Eighth Day of February 1983

[SEAL]

Attest:

GERALD J. MOSSINGHOFF

Attesting Officer

Commissioner of Patents and Trademarks